Nov. 27, 1945.  E. G. BAKER  2,389,714
ENGINE FUEL GASIFIER
Filed March 11, 1942  2 Sheets-Sheet 1
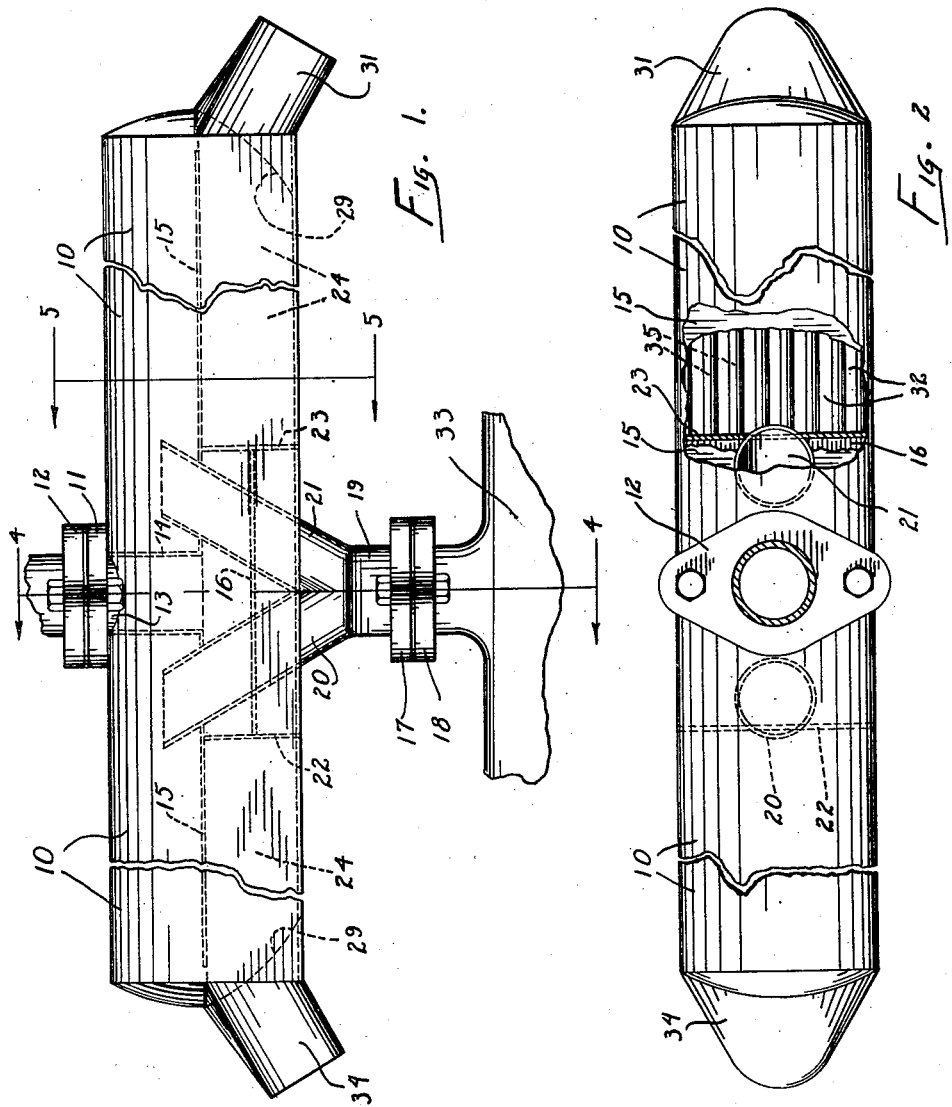
INVENTOR,
ERWIN G. BAKER,
BY Minturn & Minturn
ATTORNEYS.

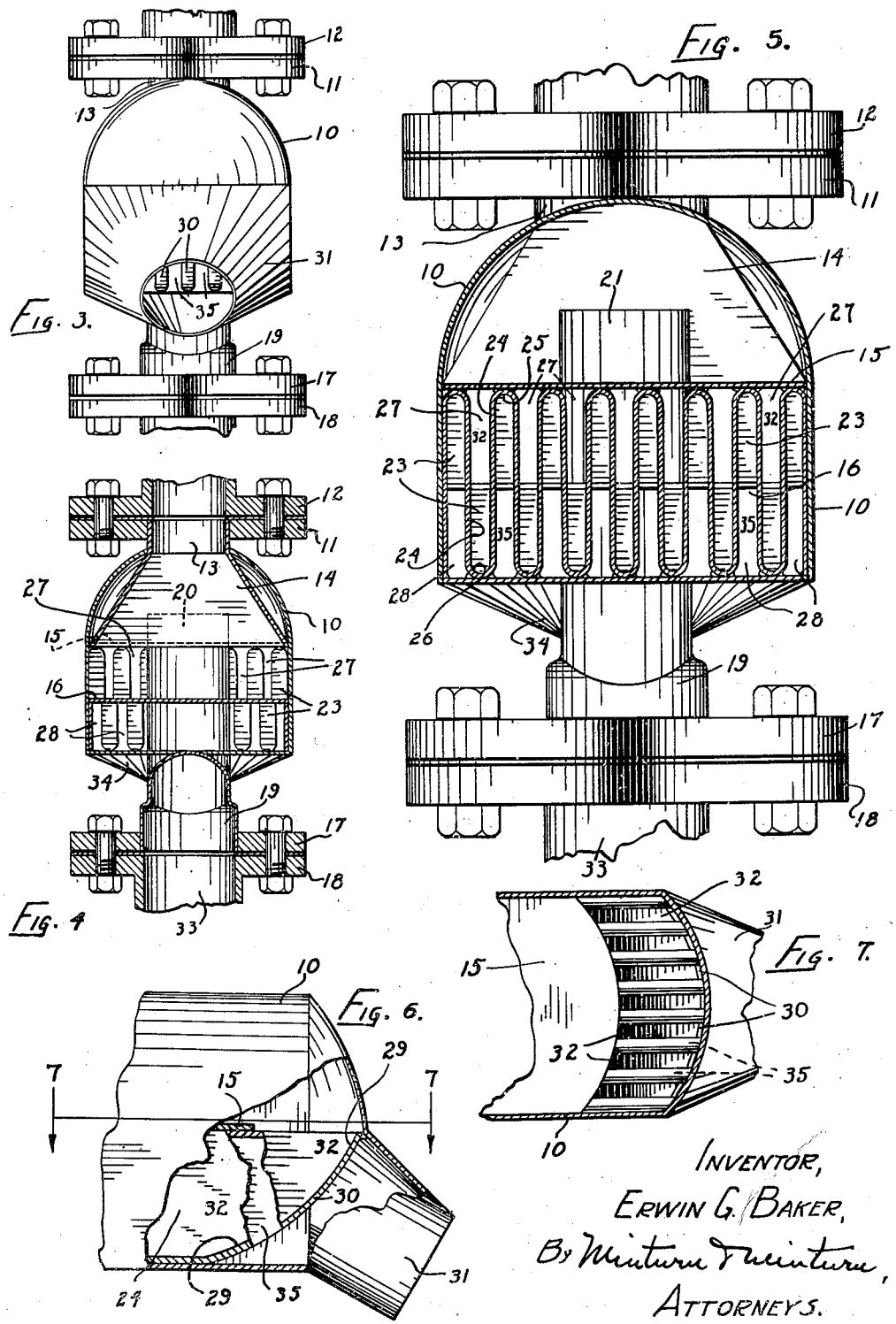

Patented Nov. 27, 1945

2,389,714

UNITED STATES PATENT OFFICE 2,389,714

ENGINE FUEL GASIFIER

Erwin G. Baker, Indianapolis, Ind.

Application March 11, 1942, Serial No. 434,230

3 Claims. (Cl. 257—241)

This invention relates to means for conditioning a fuel mixture for internal combustion engines, and in the present form is shown in an installation wherein a carbureted mixture is conditioned. A primary object of the invention is to provide an apparatus which will so condition a fuel mixture, such as gasoline and air, that the fuel consumption of the engine receiving that conditioned mixture will be materially reduced. This means that when the apparatus is employed in conjunction with an automobile engine, the mileage per gallon of gasoline is increased.

A further primary object of the invention is to provide such a structure for the purpose above indicated that may be installed with a minimum change in standard equipment and location of elements in automobiles already built. In the present form of the invention, the apparatus is incorporated in one single unit which is interposed between the carburetor and the intake manifold, standardized fittings being employed so as to make this installation possible simply by bolting the elements together. Then the exhaust pipe from the engine is connected to one end of the apparatus to discharge from the other end into a pipe leading to the standard muffler or simply to a tail pipe.

To condition the fuel mixture, it is a primary purpose of the structure to utilize heat from exhaust gases to effect a major heat transfer therefrom to the fuel mixture whereby that mixture is heated to approximately the temperature of those exhaust gases, all to the end that the fuel itself is reduced to a gaseous state as opposed to the heretofore employed moist vaporous state or even droplets.

As above indicated, not only does the apparatus serve to conserve fuel but the apparatus itself is exceedingly simple to make and requires a minimum amount of material, principally light sheet metal preferably. Sheet metal is employed as the preferred material in order to permit use of thin metal walls through which the heat is to be transferred.

A still further important advantage of the invention is found in the fact that the apparatus itself in addition to serving as a fuel conditioning unit serves exceptionally well as a muffler so that the customary muffler located remotely from the engine may be in most instances eliminated.

These and other objects and advantages of the invention will become apparent to those versed in the art in the following description of one particular form of the invention as illustrated in the accompanying drawings, in which Fig. 1 is a view in side elevation of a structure embodying the invention;

Fig. 2, a top plan view with fragments of various walls broken away to disclose interior construction;

Fig. 3, a view in end elevation;

Fig. 4, a view in vertical transverse section on the line 4—4 in Fig. 1;

Fig. 5, a view on a much enlarged scale in vertical transverse section on the line 5—5 in Fig. 1;

Fig. 6, a detail view in side elevation in partial section of an end of the structure; and Fig. 7, a detail view in horizontal section on the line 7—7 in Fig. 6.

Like characters of reference indicate like parts throughout the several views in the drawings.

A housing 10 is formed out of any suitable material, such as sheet metal, to have a generally inverted U-shape section, the upper portion of the housing being arcuate, the side walls therebelow being in parallel planes, and a flat floor interconnecting the lower ends of those side walls.

An intake flange 11 corresponding in size and shape to the standard carburetor mounting flange 12 is centrally mounted on the top side of the housing 10 by means of a short thimble 13 interwelded between the flange 11 and the housing 10. The housing is cut through by an opening corresponding to the cross-sectional area of the thimble 13 and within the housing 10, is fixed a distributing hood 14 as a continuation of that thimble 13 within the housing 10. This hood 14, in the present example, flares outwardly and downwardly laterally of the housing 10 to terminate by a lower widened discharge end through a floor 15 fixed horizontally and transversely across the housing 10 substantially at the elevation of the juncture of the upper curved top of the housing 10 with the straight side walls thereof. Gases flowing down through the thimble 13 can be discharged only through the hood 14 and below the floor 15, the lower marginal edges of the hood 14 being welded therearound to the floor 15.

Intermediate the floor 15 and the floor of the housing 10 is positioned an impact and distributing floor 16, extending transversely across and joining with, in gas-tight connection, the side walls of the housing. This floor 16 is centrally disposed within the housing 10 in respect to its longitudinal length and the ends of the floor 16 terminate a short distance on either side of the central transverse plane through the housing.

An outlet flange 17 corresponding in size and shape to the intake manifold flange 18 is centrally positioned under and carried by the housing 10 by being positioned on the lower end of a thimble 19 from the upper end of which extend two pipes 20 and 21 in diverging directions from the center line of the thimble 19. These pipes 20 and 21, as viewed from the side, Fig. 1, form the letter V and each extend upwardly through the floor of the housing 10, the intermediate floor 16, and the floor 15, to emerge therethrough and project upwardly therebeyond in a symmetrical manner, one on each side of the hood 14, the upper ends of these pipes being open and preferably cut off to have the ends in a common horizontal plane. Where the pipes 20 and 21 pass through the various floors as indicated, the gas-tight fit with those floors is formed in any suitable manner, such as by welding. These pipes 20 and 21 are centered on the longitudinal central vertical plane through the housing 10.

The intermediate floor 16 connects by its ends with the respective vertical and transversely disposed walls 22 and 23 which extend from the floor of the housing 10 to bear at their upper edges against the under side of the floor 15, these walls 22 and 23 having gas-tight fits entirely around their marginal portions with the respective housing 10 sides and floor, and with the floor 15.

In the compartments between those walls 22 and 23 and the ends of the housing 10 and under the floor 15 are formed in each instance a plurality of spaced apart longitudinally extending walls 24 to serve as gas passageways. Referring to Fig. 5, these walls 24 are formed by alternately bending back and forth a length of sheet metal with the top and lower bends 25 and 26 respectively whereby such bends serve to space apart the walls 24 one from the other. The bends 25 and 26 bear respectively against the under side of the floor 15 and the top side of the floor of the housing 10 and are secured thereto in any suitable manner to form a gas-tight joint therewith. The important feature in this connection is that these walls 24 be relatively closely spaced in order that there be provided cross-sectional area-ways therebetween quite narrow but extending substantially from top to bottom of the space below the floor 15 whereby gas passing between adjacent walls 24 does so in a relatively thin sheet.

The ends of the walls 24 abut the wall 23 and are welded thereto. Above the floor 16, the wall 23 is provided with spaced apart slots 27 opening between alternate pairs of walls 24. In the same manner, that part of the wall 23 below the floor 16 is provided with a plurality of slots 28, these slots 28 being offset in relation to the slots 27 above whereby the slots 28 provide entrances through the wall 23 between alternating pairs of walls 24 in respect to those pairs provided with the opening slots 27 above.

Referring to Figs. 6 and 7, the outer ends of the walls 24 are cut away at their lower portions to terminate at their lower ends on a transverse line spaced inwardly from the end of the housing 10. The ends of these walls 24 are preferably rounded to assume that configuration as indicated at 29 in Figs. 1 and 6.

Those pairs of walls 24 which has the end wall 23 closed thereacross below the floor 16 are closed off at their outer ends in a gas-tight manner entirely from the floor of the housing 10 and around up to their junctures with the end of the housing 10 by any suitable means, such as by the plates 30, Fig. 7. The floor 15 terminates by its outer end at a distance spaced inwardly from the end of the housing 10 so as to leave openings between that floor end and the housing end into the space between those pairs of walls 24 whose ends above the floor 16 have openings therebetween through that wall 23.

The end of the housing 10 is closed entirely across above that portion extending above the level of the floor 15. The lower portion of the end of the housing 10 is formed into a pipe-like nipple 31 providing an entry-way into the housing 10.

By this structure thus described, the vacuum created by the engine to which the device is to be applied will create a down draft from the carburetor (not shown) through the hood 14 into the space between the floors 15 and 16. The air pulled through the carburetor picks up the gasoline in the customary manner so that there is a mixture of air and gasoline in various degrees of vaporization. This mixture is not by any means completely in a gaseous state but rather is in the so-called wet state. Upon striking the floor 16, this mixture will spread out to travel in both directions longitudinally of the housing 10 around the pipes 20 and 21 and entirely through the slots appearing in the walls 22 and 23 above the floor 16.

It is to be understood, of course, that the portion of the housing 10 under the floor 15 and between the housing end and the wall 22 is provided with the identical structure as above described in reference to the right-hand end of the device.

Taking that part of the flow of this mixture which passes through the slots in the upper part of the wall 23, this mixture enters between those pairs of walls 24 which define fuel conducting passageways 32. Upon emerging from the slots in the wall 23, this mixture may expand to the top and bottom closures of those passageways and travel along in "wiping" contact with the walls 24 to be directed by the upwardly curved end plates 30 around the outer end of the floor 15 and into the upper portion of the housing 10 thereabove. From this upper portion of the housing 10, the fuel or gas mixture will be drawn downwardly through the pipe 21 to merge into a like flow coming down the pipe 20 from the other side of the housing 10 to combine into a single flow through the nipple 19 and on down into the intake manifold 33.

Depending upon the location of the discharge end of the exhaust manifold of the engine, hot exhaust gases are taken from the engine and delivered into either the end nipple 31 or the similar opposing end nipple 34. Assuming that the gases are delivered into the nipple 31, these gases, flowing under normal exhaust pressure, will enter between those pairs of walls 24 that are not closed therebetween at their outer ends to enter into the exhaust gas passageways 35. The exhaust gas escapes through the wall 23 below the floor 16 through the slots provided therethrough at the ends of the passageways 35. This escaping gas enters into the compartment under the floor 16 to flow around the pipes 20 and 21 to leave through the slots provided in the lower part of the wall 22 and then travel out between the passageways of the closely spaced walls under the floor 15 to discharge eventually through the nipple 34.

The function of this flow of exhaust gases through the housing 10 is to bring the temperature of the walls 24 up to substantially that of the exhaust gases and also to maintain the temperature of the floor 16 at a high level. Furthermore, these exhaust gases are carried around the pipes 20 and 21 immediately adjacent their juncture so that the discharging fuel gases are reheated following their flow through the upper parts of the housing 10.

I have found it to be most desirable to utilize the heat of the exhaust gases to the fullest extent to the end that these walls 24 and the floor 16 be maintained at the highest possible temperature obtainable by use of such gases.

It is to be noted that by closely spacing the walls 24 the fuel mixture is divided into a plurality of spaced apart thinned sheets of moving gases carried into intimate contact with the walls 24 to obtain the maximum possible transfer of heat from the exhaust gases. Also it is to be noted that by the form of structure shown, the fuel gases are permitted to expand from their entrance through the upper portions of the walls 22 and 23 into the respective fuel passageways 32 to the full height of those passageways therebeyond. In any event the total combined cross-sectional area of the passageways through the device as relating to the movement of the fuel mixture, is not less than that of the intake and discharge thimbles 13 and 19 respectively.

It has been found in practice that by use of the structure above described, to secure the utmost economy, the jet orifices in the carburetor must be reduced in size in order to restrict the amount of gasoline that is picked up by the air traveling through the carburetor. In other words, the very fact that the best performance of the engine to which this device is applied is secured by reducing these jet orifices indicates the high utility of the structure. In fact, by use of the structure on a standard automobile without any other change therein with the exception of reducing the areas of the carburetor jet orifices, mileages have consistently been had of substantially 40 miles of car travel per gallon of gasoline at car speeds of 50 miles per hour, and most unexpectedly, similar mileages have been obtained in car operation through dense traffic conditions in cities where the car had to be stopped and started at the various traffic control signals at street intersections.

As has above been indicated, the structure may be made out of sheet metal so that the total weight of the device is slight. Moreover, such metal is easily manipulated and fabricated so that the relative cost is held to a minimum. While the structure may be applied to cars being built at their respective factories, it is particularly adapted for use in cars that have passed into owners' hands so that such cars may be operated with the structure involving the invention in order to conserve fuel.

Attention is directed to the fact that the housing 10 is of an elongated nature and that the sets of walls 24 in each end thereof occupy the major volume of the housing. The close spacing of these walls to form the sheet streams of the fuel mixture are most important in contributing to the success of the invention. As an example, the above indicated mileages per gallon of gasoline have been obtained on a housing substantially eighteen inches in length, meaning that the fuel mixture had to travel nine inches in each direction from the center of the housing and then return that same distance to escape from the discharge thimble 19. In further connection with the extended lengths of the walls 24, the structure is to be distinguished from the heretofore employed "hot spot" devices which provided simply a limited area of generally a single wall over which the fuel mixture was flowed. These walls 24 in any event must be of sufficient combined lengths for the fuel mixture to really become heated throughout its entire volume, and in fact, to become heated to a temperature well above that which has heretofore been considered permissible.

While I have herein shown and described my invention in the one particular form, it is quite obvious that structural changes may be employed, particularly in the manner of forming and assembling the passageway walls 24, and in such other changes as might permit casting operations, all without departing from the spirit of the invention, and it is therefore to be pointed out that the invention is not limited to that precise form beyond the limitations as may be imposed by the following claims.

I claim:

1. In a gas engine fuel heater, a housing having a bottom floor and a second floor extending longitudinally of the housing dividing it into upper and lower compartments; a third floor intermediate said other two floors shorter than the other two floors and located centrally of the housing; a fuel mixture supply pipe discharging between the second and third floors; walls at the ends of the third floor contacting the first and second floors and sides of the housing; means defining passageways comprising alternate conduits for fuel mixture and hot exhaust gas, the fuel mixture conduits communicating with openings through said end walls above the third floor and discharging at their other ends into respective upper compartments and the exhaust gas conduits communicating with openings through said end walls below the third floor and receiving exhaust gas at their other ends; a fuel mixture discharge pipe and a connecting pipe terminating in the upper compartment.

2. In a gas engine fuel heater, a housing having a bottom floor and a second floor extending longitudinally of the housing dividing it into upper and lower compartments; a fuel mixture supply pipe entering the upper compartment approximately at its midlength; an outwardly and downwardly flaring distributing hood discharging through the second floor and forming a continuation of the fuel mixture supply pipe; a third floor intermediate said other two floors, shorter than the other two and located centrally of the housing; walls at the ends of the third floor contacting the first and second floors and sides of the housing; passageways formed of metal sheets bent alternately back and forth defining alternate conduits for fuel mixture and hot exhaust gas, the fuel mixture conduits communicating with openings through said end walls above the third floor and discharging at their other ends into respective upper compartments and the exhaust gas conduits communicating with openings through said end walls below the third floor and receiving exhaust gas at their other ends; a fuel mixture discharge pipe and a pair of pipes branching from the discharge pipe and passing through all three floors and terminating in the upper compartment one on each side of the hood.

3. A gas engine fuel mixture heater comprising a housing divided by walls to form a major compartment having a length greater than its transverse width and a minor compartment centrally located in juxtaposition with the major compartment and of less length thereof; laterally spaced walls within said housing outside of said major compartment defining between alternating spaced pairs of walls a plurality of fuel conducting passageways leading from one end portion of said minor compartment along said major compartment and discharging into an outer end portion thereof; a second set of laterally spaced walls within said housing outside of said major compartment defining between alternating pairs of said spaced walls a plurality of fuel conducting passageways oppositely leading from the other end portion of said minor compartment along said major compartment and discharging into its other end portion; a fuel mixture inlet pipe discharging into said minor compartment; said housing having exhaust gas intake and outlet ports at respective opposite end portions; said pairs of spaced walls in each group being spaced apart to form exhaust gas passageways therebetween open at the exhaust gas inlet and outlet ends of said housing and further being open at and outside of said minor compartment, whereby exhaust gases entering the housing through its inlet port are conducted between walls of one group of said fuel conducting passageways and across outside of the minor compartment, between the walls of the fuel conducting passageways of the second group to discharge from the housing through said housing outlet port; and a fuel mixture outlet pipe leading from a central zone of said major compartment.

ERWIN G. BAKER.